United States Patent
Chen et al.

(10) Patent No.: US 12,018,646 B2
(45) Date of Patent: Jun. 25, 2024

(54) LARGE-SCALE MODEL TESTING SYSTEM OF FLOATING OFFSHORE WIND POWER GENERATION DEVICE AND METHOD FOR MANUFACTURING TESTING SYSTEM

(71) Applicants: Three Gorges Zhujiang Power Generation Co., Ltd., Guangdong (CN); South China University of Technology, Guangdong (CN)

(72) Inventors: Chaohe Chen, Guangdong (CN); Jialong Jiao, Guangdong (CN); Aihua Liu, Guangdong (CN); Yifeng Lin, Guangdong (CN); Qiren Wu, Guangdong (CN); Yunzhi Liu, Guangdong (CN); Xinqun Chen, Guangdong (CN); Taiping Liu, Guangdong (CN); Junfeng Liu, Guangdong (CN); Jianping Liu, Guangdong (CN); Zhongliang Wang, Guangdong (CN); Wei Wang, Guangdong (CN); Yuan Xu, Guangdong (CN); Yangyang Xue, Guangdong (CN); Chengdi Lin, Guangdong (CN); Binqi Li, Guangdong (CN); Renshu Xiong, Guangdong (CN); Xinxin Xu, Guangdong (CN); Daojun Ni, Guangdong (CN); Yajing Li, Guangdong (CN); Zhaoqing Liu, Guangdong (CN); Lili Zhou, Guangdong (CN); Pengfei Chen, Guangdong (CN); Tianhui Fan, Guangdong (CN)

(73) Assignees: Three Gorges Zhujiang Power Generation Co., Ltd., Guangzhou (CN); South China University of Technology, Guangzhou (CN)

(*) Notice: Subject to any disclaimer, the term of this patent is extended or adjusted under 35 U.S.C. 154(b) by 630 days.

(21) Appl. No.: 17/308,004

(22) Filed: May 4, 2021

(65) Prior Publication Data
US 2022/0128036 A1   Apr. 28, 2022

(30) Foreign Application Priority Data
Oct. 28, 2020 (CN) .......................... 202011172546.7

(51) Int. Cl.
F03D 13/30 (2016.01)
B63B 35/44 (2006.01)
(Continued)

(52) U.S. Cl.
CPC ............ *F03D 13/30* (2016.05); *F03D 13/25* (2016.05); *G01M 9/08* (2013.01);
(Continued)

(58) Field of Classification Search
CPC .......... F03D 13/30; F03D 13/25; F03D 17/00; G01M 9/08; G01M 10/00; G01M 9/00;
(Continued)

(56) References Cited

FOREIGN PATENT DOCUMENTS

| CN | 106014862 A | 10/2016 |
|----|-------------|---------|
| CN | 109869287 A | 6/2019 |
| EP | 2821335 A1 | 1/2015 |

OTHER PUBLICATIONS

Andrew J. Goupee, Ph.D., University of Maine; Bonjun J. Koo, Ph.D., Technip; Kostas F. Lambrakos, Ph.D., Technip; Richard W. Kimball, Ph.D., Maine Maritime Academy, "Model Tests for Three Floating Wind Turbine Concepts," Offshore Technology Conference (2012) (Year: 2012).*

(Continued)

*Primary Examiner* — Steven W Crabb (57) ABSTRACT

The present invention discloses a large-scale model testing system of a floating offshore wind power generation device,
(Continued)

and a method for manufacturing the large-scale model testing system. The large-scale model testing system comprises a floating wind power generation device model, model response measurement systems and environmental parameter measurement systems. The floating wind power generation device model comprises a floating foundation and a tower, wherein a wind turbine is connected to the top of the tower. A plurality of anchoring devices is connected to the side surface of the floating foundation. Each model response measurement system comprises an IMU unit, a wind turbine monitoring unit and an anchoring tension measurement unit. Each environmental parameter measurement system comprises a buoy-type wave height meter, a wind speed and direction meter and a flow velocity and direction meter.

9 Claims, 5 Drawing Sheets

(51) Int. Cl.
*B63B 79/15* (2020.01)
*F03D 13/25* (2016.01)
*G01M 9/08* (2006.01)

(52) U.S. Cl.
CPC ......... *B63B 2035/446* (2013.01); *B63B 79/15* (2020.01); *F05B 2260/83* (2013.01); *F05B 2260/84* (2013.01)

(58) Field of Classification Search
CPC .............. B63B 79/15; B63B 2035/446; B63B 2021/008; B63B 79/40; B63B 71/20; F05B 2260/83; F05B 2260/84; F05B 2240/93; G01L 5/04; Y02P 70/50
See application file for complete search history.

(56) References Cited

OTHER PUBLICATIONS

Nianxin Ren, Yugang Li and Jinping Ou, "The Wind-Wave Tunnel Test of a New Offshore Floating Wind Turbine with Combined Tension Leg-Mooring Line System," Proceedings of the Twenty-second (2012) International Offshore and Polar Engineering Conference (Year: 2012).*

Syed Kazim Naqvi, Worcester Polytechnic Institute Thesis, "Scale model experiments on floating offshore wind turbines," (Year: 2012).*

* cited by examiner

LARGE-SCALE MODEL TESTING SYSTEM OF FLOATING OFFSHORE WIND POWER GENERATION DEVICE AND METHOD FOR MANUFACTURING TESTING SYSTEM

CROSS-REFERENCE TO RELATED APPLICATION

This application claims priority from the Chinese patent application 202011172546.7 filed Oct. 28, 2020, the content of which are incorporated herein in the entirety by reference.

TECHNICAL FIELD

The present invention belongs to the technical field of offshore wind power generation, and more particularly, relates to a large-scale model testing system of a floating offshore wind power generation device and a method for manufacturing the testing system.

BACKGROUND

The design and development of floating offshore wind power generation devices need to evaluate their dynamic response and power generation capacities under the combined action of wind and waves, involving the coupled analysis of aerodynamic and hydrodynamic performances. Commonly used research methods include theoretical calculations of potential flow, CFD numerical simulation and model test. The test method is an indispensable technical means in the design and development process of floating offshore wind power generation devices, which can not only verify the correctness of theoretical calculation and numerical simulation methods, but also can be used to extrapolate and predict the dynamic performances and power generation efficiency of a real-scale wind power generation device in service in a real marine environment.

The existing model tests of offshore wind power generation devices are generally carried out in laboratory pools. For example, in the Chinese patents with patent numbers "CN 109599015 A", "CN 109406096 A", "CN 109406087 A" and "CN 109377841 A", a wave field and a wind field in natural sea areas can be simulated respectively by means of wave generators and wind generators, and thus the aerodynamic and hydrodynamic performances of offshore wind power generation devices under the action of wind and wave environments can be researched. However, the existing model tests carried out in the laboratory pools have certain problems:

1. there is a certain scale effect in a fluid mechanics test carried out by a wind power generation device using a small-scale model;
2. the laboratory pool has a space limitation, such that the test model is limited by a test space, and thus set to be relatively small in size; this will lead to a greater contradiction between the similarity in Reynolds number and the similarity in Froude number, making the hydrodynamic and aerodynamic loads borne by the model unable to fully satisfy the similar relationship at the same time;
3. there is a great difference between the simulated wind and wave environment in the laboratory pool and the actual three-dimensional ocean wave environment, and systematic simulation and force analysis of a mooring system cannot be effectively performed because the water depth of the laboratory pool is relatively shallow;
4. the laboratory simulation test has limited time, and it is thus difficult to accurately extrapolate and predict an extreme motion and load response of the actual offshore wind power generation device during long-term service; and
5. in the pool test, the test model is often made of glass fiber reinforced plastic or wood owing to its small size, which cannot effectively ensure the similarity in stiffness of the structure itself, and cannot monitor and analyze the structural stress and vibration mode information of the structure itself during the test.

In summary, there is an urgent need to design a large-scale floating offshore wind power generation device for model tests in real sea areas, so as to avoid the above-mentioned problems in laboratory pools and obtain more accurate test results on the basis of effective cost control.

SUMMARY

An objective of the present invention is to provide a large-scale model testing system of a floating offshore wind power generation device, and a method for manufacturing the large-scale model testing system. The large-scale model testing system can avoid the problems and deficiencies caused by tests in laboratory pools in the prior art by using a larger-scale offshore wind power generation device model, and carrying out model tests under the combined action of wind and waves in real sea areas, wherein the acquired test data can provide a true and reliable data source for the evaluation of the power response and power generation efficiency of the offshore wind power generation device under the premise of effective cost control.

In order to achieve the above objective, the technical solutions used in the present invention are as follows: A large-scale model testing system of a floating offshore wind power generation device, comprising a floating wind power generation device model, model response measurement systems and environmental parameter measurement systems, wherein the floating wind power generation device model comprises a floating foundation; the floating foundation comprises pile legs, and a support is connected between the pile legs; a tower is connected to the center of the upper surface of the floating foundation, and has a diameter that gradually decreases from the bottom end to the top end; a wind turbine is connected to the top of the tower; a plurality of anchoring devices is connected to the side surface of the floating foundation; each anchoring device comprises anchor chains that are connected to the floating foundation, and a plurality of anchor blocks connected to the respective anchor chains; each model response measurement system comprises an IMU unit, a wind turbine monitoring unit and an anchoring tension measurement unit.

Preferably, the IMU unit is fixed on the lower part of the side surface of the tower;

Preferably, the wind turbine monitoring unit is connected to the tail of the wind turbine; and the wind turbine monitoring unit comprises power and rotational speed monitoring modules and torque and thrust sensors.

Preferably, the anchoring tension measurement unit is connected to the side surface of the floating foundation, and one end of each anchor chain is connected to the anchoring tension measurement unit.

Preferably, each environmental parameter measurement system comprises a wave height meter, wherein a wind speed and direction meter is connected to the upper side of the wave height meter; a flow velocity and direction meter is connected to the lower side of the wave height meter, and located below a liquid level; and a plurality of environmental parameter measurement systems is arranged at equal intervals in a circular sea area 250 m to 350 m away from the floating foundation.

Preferably, an instrument mooring device is connected to the lower side of the wave height meter, the instrument mooring device comprising an anchor and a connecting rod, wherein one end of the connecting rod is connected to the bottom of the wave height meter, and the flow velocity and direction meter is fixed on the connecting rod.

Preferably, a capacitive wave height meter is connected to the edge of each pile leg of the floating foundation.

Preferably, a wind speed and direction meter is connected to the upper surface of each pile leg of the floating foundation, the upper side 10 m of the outer surface of the tower, and the center of a hub in front of the wind turbine, respectively.

Preferably, internal structures of the floating foundation and the tower are based on the principle of equivalent stiffness, and simplified in accordance with a real-scale device; an inherent vibration frequency of the simplified system is similar to that of the real-scale device; and a plurality of stress and strain sensors is arranged on the outer surfaces of the floating foundation and the tower, respectively.

Preferably, a method for manufacturing a large-scale model testing system of a floating offshore wind power generation device, comprising the following steps:

S1, determining a scale ratio of a model according to the law of similarity in Froude number: firstly, comprehensively determining a scale ratio of the floating foundation and the tower according to test requirements, production cost, and repeatability of wind and wave environments; then, manufacturing the floating foundation and the tower from steel; scaling external profiles of the floating foundation and the tower as same as those of the real-scale device according to the scale ratio;

S2, performing design and type selection on the wind turbine according to the principle of equivalent similarity of wind thrust: determining a geometrical scale ratio of a wind turbine model through wave height-wave period distribution parameters of a real scale and a model scale and corresponding relationships between wind velocities and wave levels; appropriately correcting geometric shapes of model blades to ensure that the horizontal thrust of the wind turbine on the upper connection of the tower and the thrust of a wind turbine in a real-scale device on the fixed end of the tower meet a Froude number similarity condition, wherein the scale ratio of the wind turbine can be different from the scale ratio of the floating foundation;

S3, selecting a sea area location of a large-scale model test in conjunction with the selected model scale ratio, wherein the selection process is as follows:

a. collecting sea condition information of a working sea area of a real-scale floating offshore wind power generation device to be simulated, and calculating sea condition information required for a test of a model device according to the law of similarity;

b. calculating the law of similarity:

$$H_m = H_p/\lambda;$$

$$T_m = T_p/\sqrt{\lambda};$$

wherein, H is a significant wave height, T is a characteristic period, and $\lambda$ is a scale ratio; the subscripts p and m represent a real scale and a model scale respectively;

c. selecting a sea area under test that meets the law of similarity according to long-term statistical data of sea waves in the sea area under test and the principle of maximum repeatability, by means of comprehensive consideration of sea area location, climate season, weather conditions, offshore distance and test time;

S4, setting the manufactured floating wind power generation device model in the sea area under test, and fixing it with the anchoring devices; determining lengths and a fixing method of the anchor chains according to the water depths of the sea area under test, collecting force conditions of the anchoring devices through the anchoring tension measurement unit, and ensuring that the force conditions of the anchoring systems on the model scale and the real scale satisfy the Froude number similarity condition;

S5, deploying a plurality of environmental parameter measurement systems in a sea area at a certain distance from the floating wind power generation device model; transmitting measurement signals of the respective sensors in the model response measurement systems and the environmental parameter measurement systems to a shore-side data acquisition instrument in real time through a radio signal transmission device for storage;

S6, carrying out a wind power generation test, and predicting the dynamic response and generated power of the offshore wind power generation device on a real scale through data analysis; and S7, carrying out the simulation and force analysis of mooring systems in a deep water environment, and analyzing and predicting the states of the mooring systems of the offshore wind power generation device on a real scale; and monitoring and analyzing structural stress and vibration mode information of the wind power generation device through a plurality of stress and strain sensors on the surfaces of the floating foundation and the tower.

The present invention has the following beneficial effects.

1. The test environment is changed from a space-constrained test pool to a real sea area, such that a larger-scale offshore wind power generation device model can be used, which can effectively reduce the Reynolds scale effect. Therefore, the hydrodynamic and aerodynamic loads borne by the model satisfy a similar relationship as much as possible, so as to more accurately predict the dynamic response and generated power of the actual offshore wind power generation device.

2. The test is carried out in a real natural wind and wave environment. The hydrological conditions of a sea area under test required by the model are calculated through the law of similarity, and matched in the real seal area based on the calculation results. The sea area under test is selected to ensure that the sea area under test meets the similarity requirement as much as possible. In addition, waves acting on the model are three-dimensional waves, and the induced floating body motion response is closer to that of the real situation, thereby ensuring the accuracy of the test results.

3. The real sea area provides good water depth conditions, thanks to the fact that each part of a model body is made according to Froude's similarity criterion. Therefore, simulation and force analysis of mooring systems in a deep water environment can be carried out on the offshore wind power generation device model, which solves the problem of insufficient pool depth in laboratory model tests.

4. A scale ratio in selection and design of a wind turbine is independent of a floating foundation body, and follows the principle of equivalent similarity of wind thrust. Therefore, the similar relationship between aerodynamics and hydrodynamics in a natural wind and wave environment can be met by redesigning, type-selecting and combining the wind turbine and its blades, which is conducive to studying the coupling performance of aerodynamics and hydrodynamics of the floating wind power generation device.

5. The wind and waves in the prior art are artificially made by wind turbines and wave generators, which cannot meet the needs of continuous long-term testing. However, in the present invention, medium- and long-term continuous tests can be carried out by placing the large-scale wind power generation device on the sea. The tests can last for several months to several years, under different climatic conditions, so as to measure more data and provide more sufficient data samples for statistical analysis.

6. Since the tests are carried out in the real sea area and a scale ratio of a testing device body can be set to be larger, the large-scale testing device body can be machined by steel, wherein the external structure of the large-scale testing device is scaled, and the internal structure of the large-scale testing device is simplified, as long as the similarity in rigidity of main structures is satisfied. Such a testing device can effectively simulate the structural stress and vibration mode of the wind power generation device in operation on a real scale, so as to perform monitoring and data analysis, which is conducive to a more comprehensive understanding of operating conditions of the offshore wind power generation device on the real scale.

BRIEF DESCRIPTION OF THE DRAWINGS

The present invention will be further described below in conjunction with the accompanying drawings and embodiments.

The reference symbols represent the following components: 1—floating foundation; 2—tower; 3—wind turbine; 4—anchoring device; 5—anchor chain; 6—anchor block; 7—IMU unit; 8—wind turbine monitoring unit; 9—anchoring tension measurement unit; 10—buoy-type wave height meter; 11—wind speed and direction meter; 12—flow velocity and direction meter; 13—capacitive wave height meter; 15—instrument mooring device; 16—pile legs; 17—support; 18—anchor; 19—connecting rod; 20—stress and strain sensors; 81—power and rotational speed monitoring modules; 82—torque and thrust sensors.

DETAILED DESCRIPTION

Embodiment 1

Figure 1:
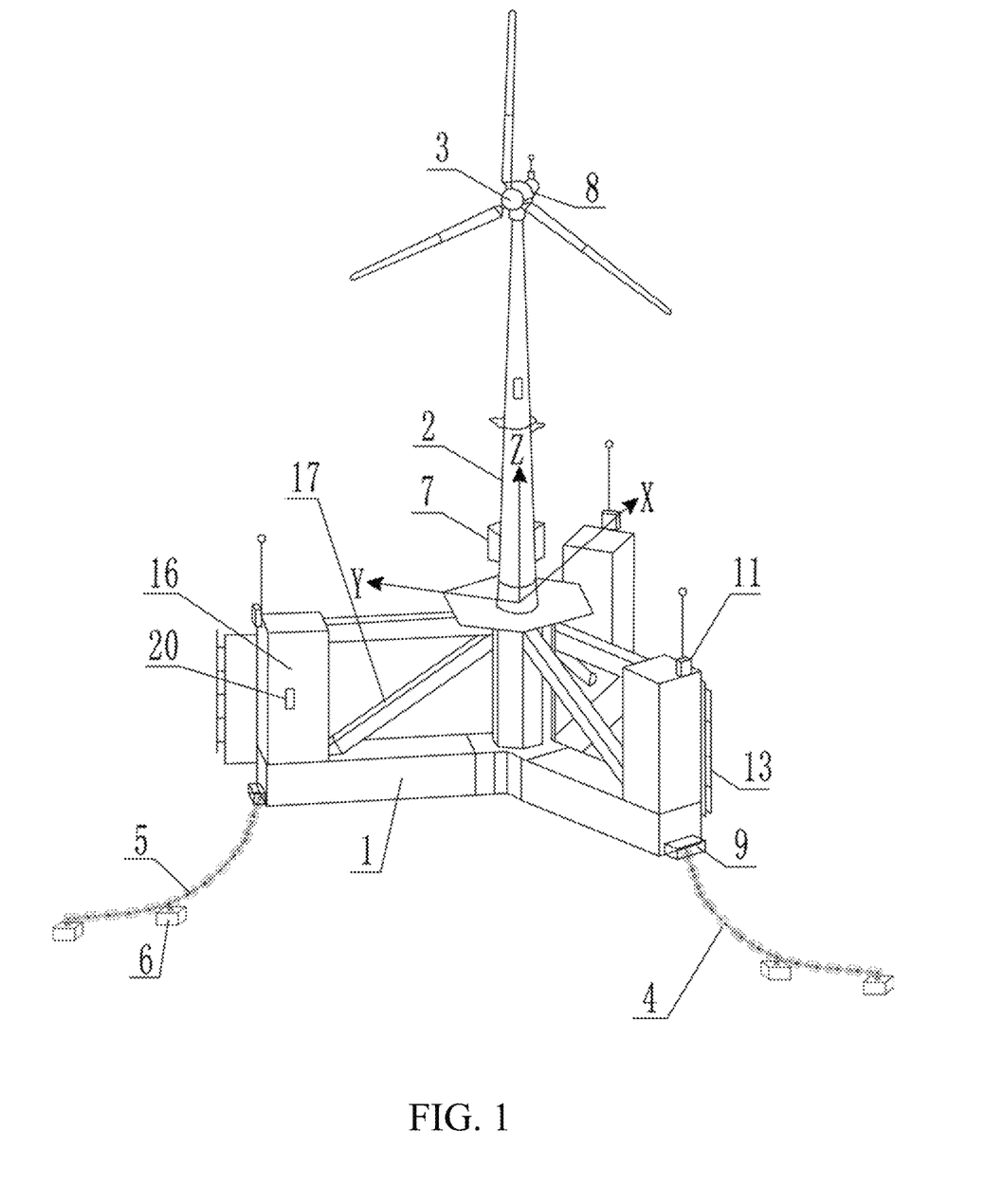
FIG. 1 is a schematic structural diagram of a large-scale model of a floating offshore wind power generation device in an embodiment of the present invention.
Figure 2:
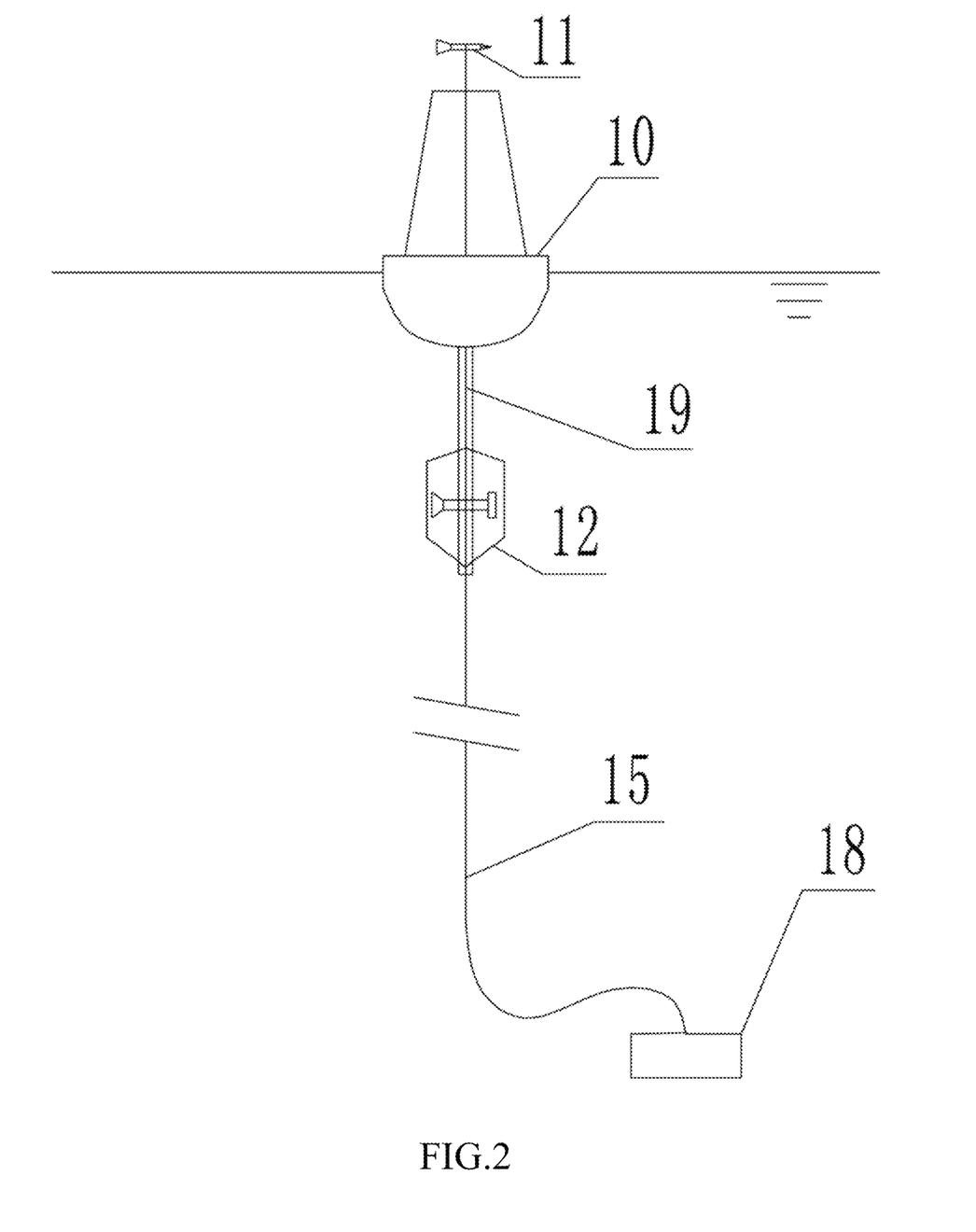
FIG. 2 is a schematic structural diagram of an integrated environmental monitoring instrument in an embodiment of the present invention.
Figure 5:
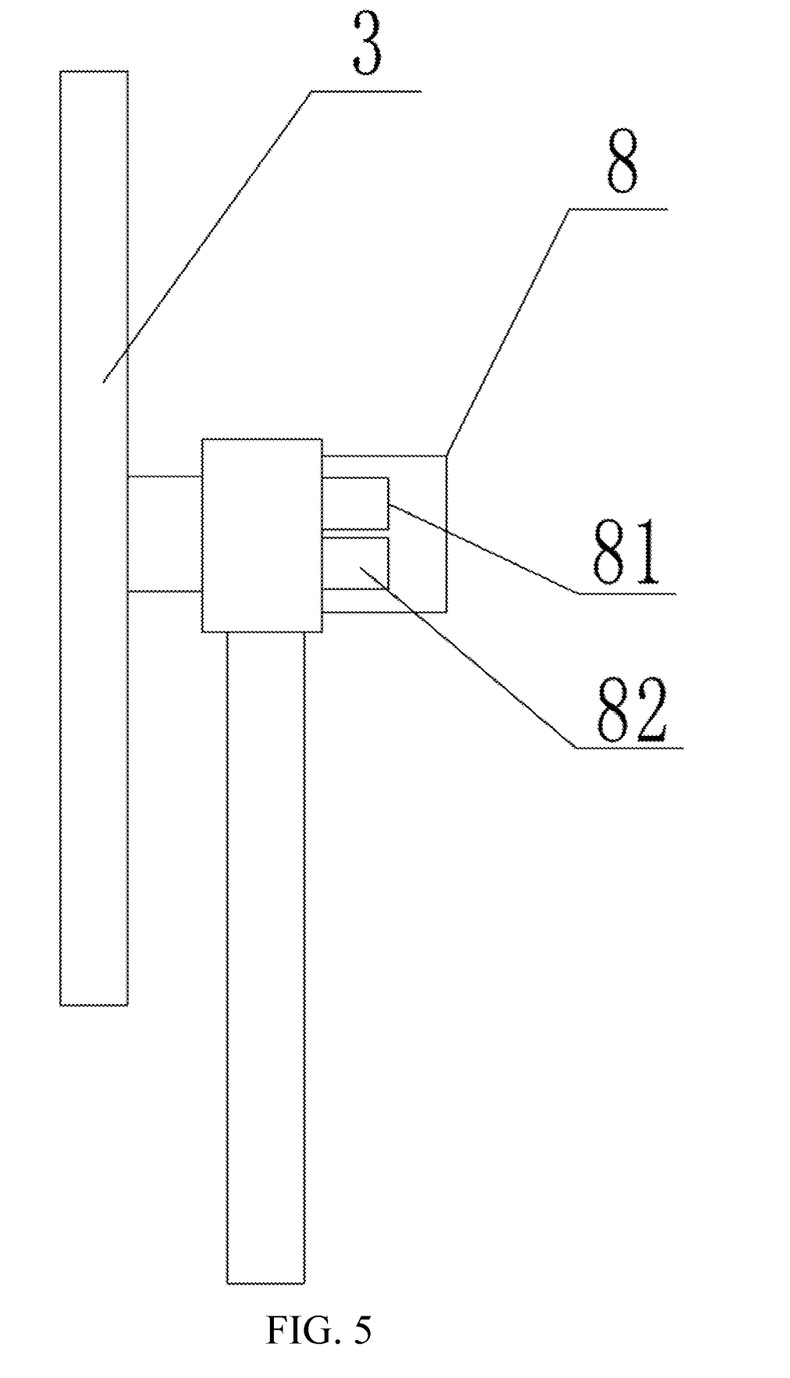
FIG. 5 is a schematic diagram of an installation position of a wind turbine monitoring unit in an embodiment of the present invention.

As shown in FIG. 1, FIG. 2 and FIG. 5, a large-scale model testing system of a floating offshore wind power generation device comprises a floating wind power generation device model, model response measurement systems and environmental parameter measurement systems, wherein the floating wind power generation device model comprises a floating foundation 1; the floating foundation 1 comprises pile legs 16, and a support 17 is connected between the pile legs 16; a tower 2 is connected to the center of the upper surface of the floating foundation 1, and has a diameter that gradually decreases from the bottom end to the top end; a wind turbine 3 is connected to the top of the tower 2; a plurality of anchoring devices 4 is connected to the side surface of the floating foundation 1; each anchoring device 4 comprises anchor chains 5 that are connected to the floating foundation 1, and a plurality of anchor blocks 6 connected to the respective anchor chains 5; the model response measurement system comprises an IMU unit 7, a wind turbine monitoring unit 8 and an anchoring tension measurement unit 9.

Preferably, the IMU unit 7 is fixed on the lower part of the side surface of the tower 2; and the IMU unit 7 may be configured to measure six-degree-of-freedom motion and acceleration information of a floating foundation 1.

Preferably, a wind turbine monitoring unit 8 is connected to the tail of the wind turbine 3; the wind turbine monitoring unit 8 comprises power and speed monitoring modules 81 and torque and thrust sensors 82; and the wind turbine monitoring unit 8 may be configured to measure a rotational speed, thrust, torque and power of blades of the wind turbine 3.

Preferably, the anchoring tension measurement unit 9 is connected to the side surface of the floating foundation 1, and one end of each anchor chain 5 is connected to the mooring tension measurement unit; a tension sensor is selected as the anchoring tension measurement unit 9 and configured to measure the stress of the anchor chains 5.

Preferably, each environmental parameter measurement system comprises a buoy-type wave height meter 10, wherein a wind speed and direction meter 11 is connected to the upper side of the buoy-type wave height meter 10; a flow velocity and direction meter 12 is connected to the lower side of the buoy-type wave height meter 10, and located below a liquid level; a plurality of environmental parameter measurement systems is arranged at equal intervals in a circular sea area 250 m to 350 m away from the floating foundation; the buoy-type wave height meter 10 is arranged at a certain distance from the wind power generation device model to measure sea wave information in a sea area under test; the wind speed and direction meter 11 is arranged at a certain distance from the wind power generation device model to measure a wind speed and a wind direction of the sea area under test; and the velocity flow and direction meter 12 is arranged at a certain distance from the wind power generation device model to measure the flow velocity and a flow direction of the sea area under test.

Preferably, an instrument mooring device 15 is connected to the lower side of the buoy-type wave height meter 10, the instrument mooring device 15 comprising an anchor 18 and a connecting rod 19, wherein one end of the connecting rod 19 is connected to the bottom of the buoy-type wave height meter 10, and the flow velocity and direction meter 12 is fixed on the connecting rod 19. A weight-balanced solid steel pipe is used as the connecting rod 19, which can keep the attitude and position of the buoy-type wave height meter 10 stable in cooperation with the instrument mooring device 15.

Preferably, a capacitive wave height meter 13 is connected to the edge of each pile leg 16 of the floating foundation 1, and configured to measure a real-time wave height acting on each pile leg 16.

Preferably, the wind speed and direction meter 11 is connected to the upper surface of each pile leg 16 of the floating foundation 1, a position on the outer surface of the tower 2 at a height of 10 m from the sea surface, and the center of a hub in front of the wind turbine 3, respectively.

Preferably, internal structures of the floating foundation 1 and the tower 2 are based on the principle of equivalent stiffness, and simplified in accordance with a real-scale device; an inherent vibration frequency of the simplified system is similar to that of the real-scale device; and a plurality of stress and strain sensors 20 is arranged on the outer surfaces of the floating foundation 1 and the tower 2, respectively, and configured to monitor structural stress and vibration mode information of the wind power generation device.

Embodiment 2

As shown in FIGS. 1~5, preferably, a method for manufacturing a large-scale model testing system of a 7 MW floating offshore wind power generation device comprises the following steps.

S1, determining a scale ratio of a model according to the law of similarity in Froude number: firstly, comprehensively determining a scale ratio 1:10 of the floating foundation 1 and the tower 2 according to test requirements, production cost, and repeatability of wind and wave environments; then, manufacturing the floating foundation 1 and the tower 2 from steel; scaling external profiles of the floating foundation 1 and the tower 2 as same as those of the real-scale device according to the scale ratio; The scale factors of respective physical quantities are shown in the following table: ($\lambda=10$)

| Parameter | Scale ratio | Parameter | Scale ratio | Parameter | Scale ratio |
| --- | --- | --- | --- | --- | --- |
| Geometric length | $\lambda$ | Area | $\lambda^2$ | Volume | $\lambda^3$ |
| Angle | 1 | Fluid density | 1 | Mass | $\lambda^3$ |
| Time | $\lambda^{1/2}$ | Frequency | $\lambda^{-1/2}$ | Linear velocity | $\lambda^{1/2}$ |
| Linear acceleration | 1 | Angular velocity | $\lambda^{-1/2}$ | Angular acceleration | $\lambda^{-1}$ |
| Force | $\lambda^3$ | Moment | $\lambda^4$ | Power | $\lambda^{3.5}$ |
| Young modulus | 1 | Stress | 1 | Mass moment of inertia | $\lambda^5$ |

S2, performing design and type selection on the wind turbine according to the principle of equivalent similarity of wind thrust: determining a geometrical scale ratio 1:10 of a wind turbine 3 model through wave height-wave period distribution parameters of a real scale and a model scale and corresponding relationships between wind velocities and wave levels; appropriately correcting geometric shapes of model blades to ensure that the horizontal thrust of the wind turbine 3 on the upper connection of the tower 2 and the thrust of a wind turbine in a real-scale device on the fixed end of the tower meet a Froude number similarity condition; Considering that a wind speed of an offshore wind field under the combined action of wind and waves on a model scale is often higher than a wind speed target value obtained by Froude similarity conversion, a wind turbine model 3 in the test can be selected with a smaller model size; and a hub height of the wind turbine (a height from the water surface) is 9.5 m.

Figure 4:
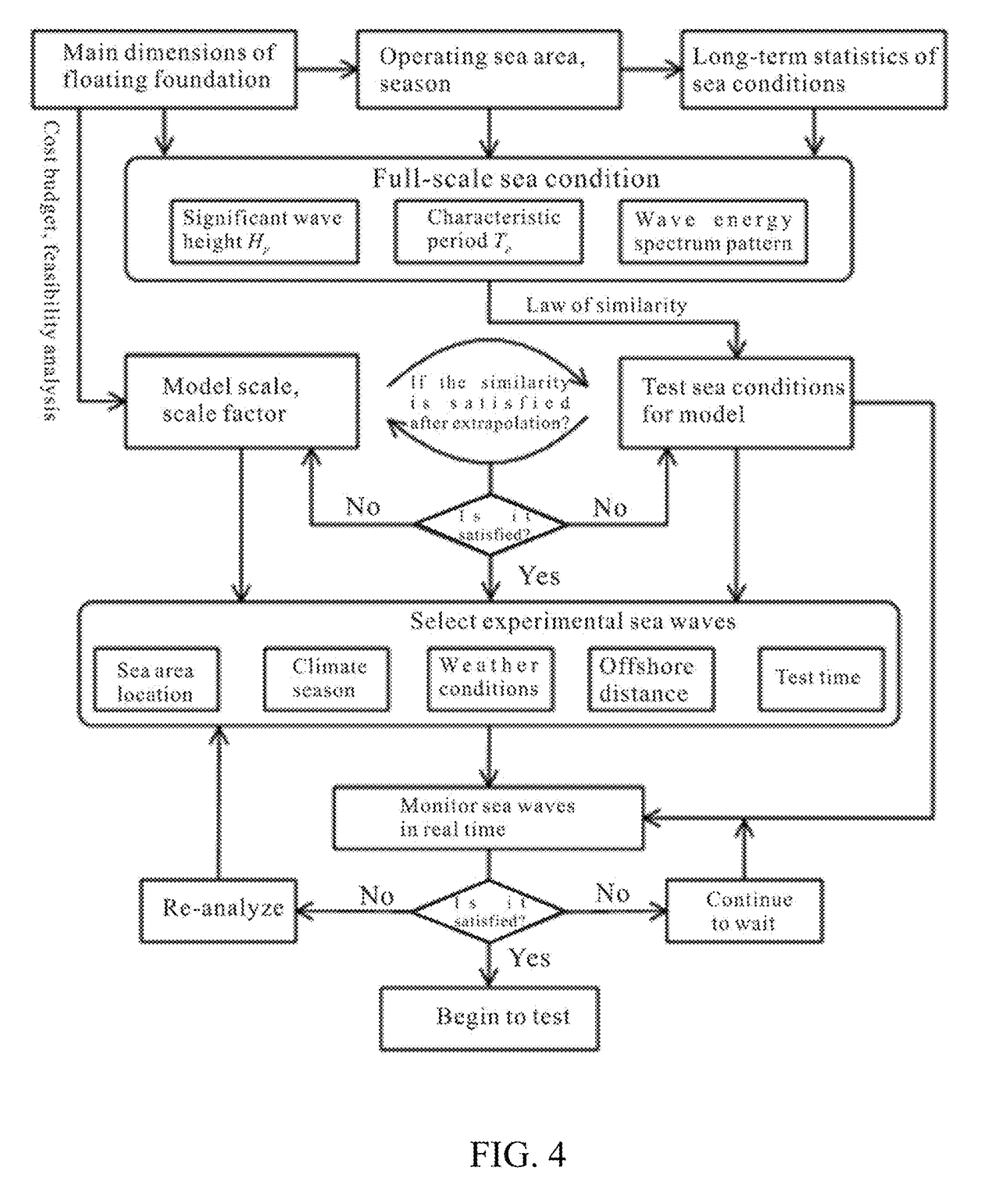
FIG. 4 is a flowchart of sea condition selection for a large-scale model test in an embodiment of the present invention.

S3, selecting a sea area location of a large-scale model test in conjunction with the selected model scale ratio, wherein the selection process is as follows:
  a. collecting sea condition information of a working sea area of a real-scale floating offshore wind power generation device to be simulated, and calculating sea condition information required for a test of a model device according to the law of similarity;
  b. calculating the law of similarity:

$$H_m = H_p/\lambda;$$

$$T_m = T_p/\sqrt{\lambda};$$

wherein, H is a significant wave height, T is a characteristic period, and $\lambda$ is a scale ratio; the subscripts p and m represent a real scale and a model scale respectively;
  c. selecting a sea area under test that meets the law of similarity according to long-term statistical data of sea waves in the sea area under test and the principle of maximum repeatability, by means of comprehensive consideration of sea area location, climate season, weather conditions, offshore distance and test time;

S4, setting the manufactured floating wind power generation device model in the sea area under test, and fixing it with the anchoring devices 4; determining lengths and a fixing method of the anchor chains 5 according to the water depths of the sea area under test, collecting force conditions of the anchoring devices 4 through the anchoring tension measurement unit 9, and ensuring that the force conditions of the anchoring systems on the model scale and the real scale satisfy the Froude number similarity condition; The design results of the installed device body in the model scale and the real scale are as follows:

| Parameter | Model design value | Full-scale conversion result | Full-scale target value | Desired scale ratio | Actual scale ratio |
| --- | --- | --- | --- | --- | --- |
| Floating body draft | 3 m | 30 m | 30 m | 10 | 10 |
| Floating body height (Not including tower) | 4 m | 40 m | 40 m | 10 | 10 |
| Depth of sea area | 12 m | 120 m | 120 m | 10 | 10 |
| Diameter of wind turbine | 8 m | 80 m | 160 m | 10 | 20 |
| Rated power | 5.4 kW | 17 MW | 7 MW | 10 | 7.7 |
| Material of floating body | Steel | Steel | Steel | Same | |
| Material of tower | Steel | Steel | Steel | Same | |
| Number of catenaries | 3 | 3 | 3 | Same | |

Figure 3:
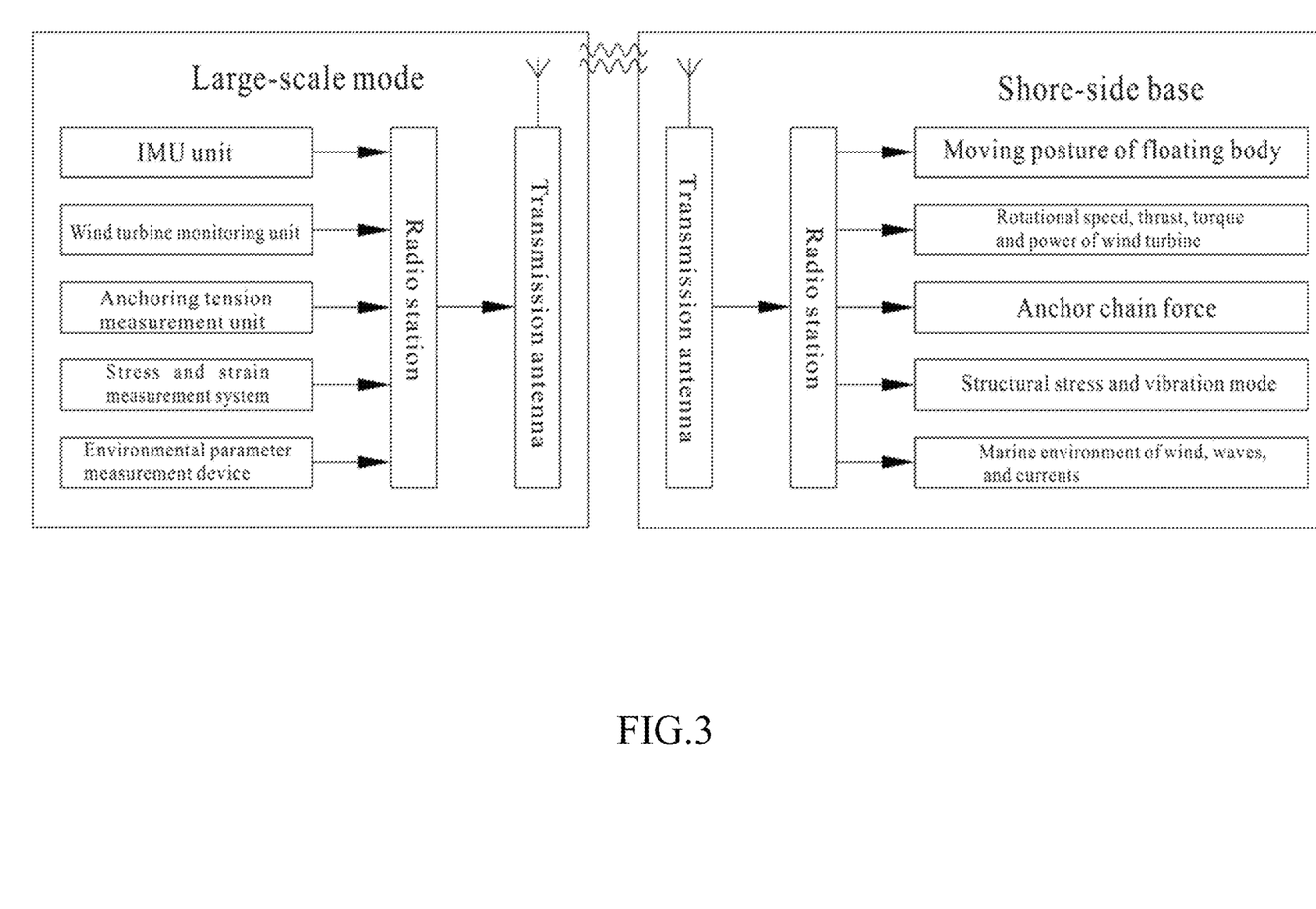
FIG. 3 is a schematic diagram of a remote monitoring system for monitoring data in an embodiment of the present invention.

S5, deploying a plurality of environmental parameter measurement systems at equal intervals in the circular sea area about 300 m around the floating wind power generation device model; transmitting measurement signals of the respective sensors in the model response measurement systems and the environmental parameter measurement systems to a shore-side data acquisition instrument in real time through a radio signal transmission device for storage;

S6, carrying out a wind power generation test, and predicting the dynamic response and generated power of the offshore wind power generation device on a real scale through data analysis; and S7, carrying out the simulation and force analysis of mooring systems in a deep water environment, and analyzing and predicting the states of the mooring systems of the offshore wind power generation device on a real scale; and monitoring and analyzing structural stress and vibration mode information of the wind power generation device through a plurality of stress and strain sensors 20 on the surfaces of the floating foundation 1 and the tower 2.

Further, measurement signals of the respective sensors in the model response measurement systems and the environmental parameter measurement systems are transmitted through radio signals and transferred to a shore-side data acquisition instrument in real time. On the one hand, the loss of offshore test data can be avoided; and on the other hand, real-time monitoring and safety assessment can also be carried out on the state of the floating wind power generation device system.

The above-mentioned embodiments are only preferred technical solutions of the present invention, and should not be regarded as a limitation of the present invention. The embodiments in this application and the features in the embodiments can be combined with each other arbitrarily without conflict. The protection scope of the present invention should be subject to the technical solutions described in the claims, including equivalent replacement solutions of the technical features in the technical solutions described in the claims. Thus, any equivalent replacements within this scope shall be encompassed by the protection scope of the present invention.

What is claimed is:

1. A large-scale model testing system of a floating offshore wind power generation device, comprising:
    a floating wind power generation device model, model response measurement systems and environmental parameter measurement systems, wherein the floating wind power generation device model comprises a floating foundation (1); the floating foundation (1) comprises pile legs (16), and a support (17) is connected between the pile legs (16); a tower (2) is connected to a center of an upper surface of the floating foundation (1), and has a diameter that gradually decreases from a bottom end to a top end; a wind turbine (3) is connected to a top of the tower (2); a plurality of anchoring devices (4) is connected to a side surface of the floating foundation (1); each anchoring device (4) comprises anchor chains (5) that are connected to the floating foundation (1), and a plurality of anchor blocks (6) connected to the respective anchor chains (5); each model response measurement system comprises an Inertial measurement unit (IMU) (7), a wind turbine monitoring unit (8) and an anchoring tension measurement unit (9);
    a method for manufacturing the large-scale model testing system of a floating offshore wind power generation device comprising the following steps:

S1, determining a scale ratio of the floating wind power generation device model according to a law of similarity in Froude number: firstly, comprehensively determining a scale ratio of the floating foundation (1) and the tower (2) according to test requirements, production cost, and repeatability of wind and wave environments; then, manufacturing the floating foundation (1) and the tower (2) from steel; scaling external profiles of the floating foundation (1) and the tower (2) as same as those of a real-scale device according to the scale ratio;

S2, performing design and type selection on the wind turbine according to a principle of equivalent similarity of wind thrust: determining a geometrical scale ratio of a wind turbine (3) model through wave height-wave period distribution parameters of a real scale and a model scale and corresponding relationships between wind velocities and wave levels; appropriately correcting geometric shapes of model blades to ensure that a horizontal thrust of the wind turbine (3) model on the upper connection of the tower (2) and a thrust of a wind turbine (3) in the real-scale device on the fixed end of the tower (2) meet a Froude number similarity condition, wherein the geometrical scale ratio of the wind turbine (3) model can be different from the scale ratio of the floating foundation (1);

S3, selecting a sea area location of a large-scale model test in conjunction with a selected model scale ratio, wherein the selection process is as follows:

a. collecting sea condition information of a working sea area of a real-scale floating offshore wind power generation device to be simulated, and calculating sea condition information required for a test of a model device according to a law of similarity;

b. calculating the law of similarity:

$$H_m = H_p/\lambda;$$
$$T_m = T_p/\sqrt{\lambda};$$

wherein, H is a significant wave height, T is a characteristic period, and λ is a scale ratio; the subscripts p and m represent a real scale and a model scale respectively;

c. selecting a sea area under test that meets the law of similarity according to long-term statistical data of sea waves in the sea area under test and a principle of maximum repeatability, by means of comprehensive consideration of sea area location, climate season, weather conditions, offshore distance and test time;

S4, setting the manufactured floating wind power generation device model in the sea area under test, and fixing it with the anchoring devices (4); determining lengths and a fixing method of the anchor chains (5) according to the water depths of the sea area under test, collecting force conditions of the anchoring devices (4) through the anchoring tension measurement unit (9), and ensuring that the force conditions of the anchoring systems on the model scale and the real scale satisfy the Froude number similarity condition; and S5, deploying a plurality of environmental parameter measurement systems in a sea area at a certain distance from the floating wind power generation device model; transmitting measurement signals of the respective sensors in the model response measurement systems and the environmental parameter measurement systems to a shore-side data acquisition instrument in real time through a radio signal transmission device for storage.

2. The large-scale model testing system of the floating offshore wind power generation device according to claim 1, wherein the IMU (7) is fixed on a lower part of a side surface of the tower (2); the wind turbine monitoring unit (8) is connected to a tail of the wind turbine (3); and the wind turbine monitoring unit (8) comprises power and rotational speed monitoring modules (81) and torque and thrust sensors (82).

3. The large-scale model testing system of the floating offshore wind power generation device according to claim 1, wherein the anchoring tension measurement unit (9) is connected to a side surface of the floating foundation (1), and one end of each anchor chain (5) is connected to the anchoring tension measurement unit (9).

4. The large-scale model testing system of the floating offshore wind power generation device according to claim 1, wherein each environmental parameter measurement system comprises a wave height meter (10), wherein a wind speed and direction meter (11) is connected to a upper side of the wave height meter (10); a flow velocity and direction meter (12) is connected to a lower side of the wave height meter (10), and located below a liquid level; and a plurality of environmental parameter measurement systems is arranged around the floating foundation (1).

5. The large-scale model testing system of the floating offshore wind power generation device according to claim 4, wherein an instrument mooring device (15) is connected to the lower side of the wave height meter (10), the instrument mooring device (15) comprising an anchor (18) and a connecting rod (19), wherein one end of the connecting rod (19) is connected to the bottom of the wave height meter (10), and the flow velocity and direction meter (12) is fixed on the connecting rod (19).

6. The large-scale model testing system of the floating offshore wind power generation device according to claim 1, wherein a capacitive height wave meter (13) is connected to the edge of each pile leg (16) of the floating foundation (1).

7. The large-scale model testing system of the floating offshore wind power generation device according to claim 1, wherein a wind speed and direction meter (11) is connected to an upper surface of each pile leg (16) of the floating foundation (1), an upper side of the outer surface of the tower (2), and the center of a hub in front of the wind turbine (3), respectively.

8. The large-scale model testing system of the floating offshore wind power generation device according to claim 1, wherein internal structures of the floating foundation (1) and the tower (2) are based on a principle of equivalent stiffness, and simplified in accordance with the real-scale device; an inherent vibration frequency of the simplified system is similar to that of the real-scale device; and a plurality of stress and strain sensors (20) is arranged on the outer surfaces of the floating foundation (1) and the tower (2), respectively.

9. An application of the method for manufacturing a large-scale model testing system of a floating offshore wind power generation device according to claim 1 in state monitoring and analysis of the floating offshore wind power generation device on a real scale, specifically as follows:

analysis and prediction of dynamic response and generated power, analysis and prediction of states of mooring systems, and monitoring and analysis of structural stress and vibration mode information of the floating offshore wind power generation device.

\* \* \* \* \*